(12) United States Patent
Stollery

(10) Patent No.: US 7,233,911 B1
(45) Date of Patent: Jun. 19, 2007

(54) SYSTEM FOR DEDUCTING AND ADDING A PERCENTAGE OF A CUSTOMER'S PURCHASE AMOUNT TO A JACKPOT

(75) Inventor: Anthony Ross Glen Stollery, Hamilton (NZ)

(73) Assignee: Fortune Machine Corporation Limited (NZ)

( * ) Notice: Subject to any disclaimer, the term of this patent is extended or adjusted under 35 U.S.C. 154(b) by 0 days.

(21) Appl. No.: 09/719,682

(22) PCT Filed: Jul. 15, 1999

(86) PCT No.: PCT/NZ99/00111

§ 371 (c)(1),
(2), (4) Date: Feb. 5, 2001

(87) PCT Pub. No.: WO00/04472

PCT Pub. Date: Jan. 27, 2000

(30) Foreign Application Priority Data

Jul. 17, 1998 (NZ) ...................................... 331035

(51) Int. Cl.
*G06Q 30/00* (2006.01)
(52) U.S. Cl. .............................. 705/14; 705/26; 705/27; 705/1; 463/1; 463/19; 463/25; 463/27; 235/375; 235/380; 235/382

(58) Field of Classification Search .................. 705/14, 705/26, 27; 235/375, 380; 463/1, 25, 29
See application file for complete search history.

(56) References Cited

U.S. PATENT DOCUMENTS

| | | | | |
|---|---|---|---|---|
| 4,669,730 A * | 6/1987 | Small | ............................ | 463/17 |
| 4,815,741 A * | 3/1989 | Small | ............................ | 463/17 |
| 5,085,435 A * | 2/1992 | Rossides | ....................... | 705/14 |
| 5,851,011 A * | 12/1998 | Lott | ............................. | 273/292 |
| 6,243,688 B1 * | 6/2001 | Kalina | ........................... | 705/14 |
| 6,248,688 B1 * | 6/2001 | Wu et al. | ..................... | 502/302 |
| 6,916,245 B1 * | 7/2005 | Vancura et al. | ............... | 463/26 |

* cited by examiner

*Primary Examiner*—Jean D. Janvier
(74) *Attorney, Agent, or Firm*—Finnegan, Henderson, Farabow, Garrett & Dunner, LLP

(57) ABSTRACT

A method of manipulating retail data characterised by the steps of entering a purchase amount into electronic data manipulation system, and adding a percentage of the purchase amount via the data manipulation system to a jackpot total associated with the method of data manipulation, and operating a random number generated to trigger a jackpot pay-out between a range of funds, and indicating via the data manipulation system whether the purchase amount triggered the jackpot.

6 Claims, 1 Drawing Sheet

SYSTEM FOR DEDUCTING AND ADDING A PERCENTAGE OF A CUSTOMER'S PURCHASE AMOUNT TO A JACKPOT

TECHNICAL FIELD

This invention relates to retail data manipulation.

In particular, this invention relates to improvements to the manipulation of retail data manipulation which allow the data to be used as a promotional tool for retail.

BACKGROUND ART

With the proliferation of large shopping malls, there is increased competition between malls to attract shoppers to them. Often what is perceived as necessary to attract shoppers is a mall-wide promotion which involves a large proportion of the shops at the mall, rather than individual shop promotions.

In addition to attracting shoppers to the shopping mall, it is also of course desirable to encourage those shoppers to spend as much money as possible at the shops.

Unfortunately, conventional promotional methods have become stale and no longer inspire shoppers. It would be desirable if there could be provided a less conventional promotional method that not only attracts shoppers to shopping malls but also has ah element which encourages shoppers to spend money there. That is, a promotional system that has the potential to benefit the shoppers geared on their level of spending.

Other aspects of the retail industry could also benefit from a new promotion tool. For example, shopping chains such as service stations, fast food outlets, and other shopping networks could benefit It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a method of manipulating retail data characterised by the steps of:
a) entering a purchase amount into an electronic data manipulation system, and
b) adding a percentage of the purchase amount via the data manipulation system to a jackpot total associated with the method of data manipulation, and
c) operating a random number generator to trigger a jackpot pay out between a range of funds, and
d) indicating via the data manipulation system whether the purchase amount triggered the jackpot.

The term purchase amount is defined herein as being an actual purchase amount or a value proportional thereto.

It is envisaged that the present invention may operate using a jackpot system similar to that used with groups of gaming machines linked together in such establishments as bars, clubs and possibly casinos.

The operation of such jackpot schemes is as follows:

Each machine can run independently according to its original program. Sometimes there is a difference—the percentage pay out of such a machine being less than if it was not connected up to a jackpot scheme.

Each machine incorporates a meter bank which records the turnover of the gaming machine. Therefore current jackpot schemes are set up to count these turnover meter increments.

The jackpot scheme uses an electronic device that intercepts a signal from the machine to the meter bank. The number of pulses sent by the game machine to the meter bank is proportional to the amount of money wagered on the gaming machine. Therefore, current jackpot schemes are set up to extract a small percentage of the turnover increment (say 3%) which is used to generate an amount to be displayed in a jackpot scheme.

In some embodiments of this scheme there may be applied a multiplication factor which takes into account that machines play different value games.

These jackpot schemes often have two or more value jackpot prizes running whereby the incoming contribution is divided among several prize pools, some of which may not be visible to the players until a prize is struck, at which point they replace the awarded prize. To keep interest in the jackpots high, a proportion of the signal may also be reserved to provide a back up value so that when a jackpot is struck, this means that the awarded prize does not start incrementing from zero, thus retaining player interest.

For example, 40% of the intercepted pulses may go to the major jackpot face value, 30% may go to a minor jackpot face value, 20% may go to a major backup jackpot value, and 10% may go to a minor backup value.

Such a scheme as described above can be adapted in accordance with some embodiments of the present invention adapted for use in retail situations as described.

With the present invention, instead of gaming machines however, the contribution to the jackpot scheme is derived from the amount of a retail purchase which is made.

Physically, this could be achieved by having a direct connection from an electronic till to the jackpot system controller.

However, in preferred embodiments it is envisaged that the present invention will employ a dedicated terminal which is installed into each retail outlet and is tied to the jackpot system controller through some type of communication medium.

For example, there may be a separate electronic device on the counter.

The separate device may have a key pad or some other input device (perhaps swipe card, infrared scanner, or the like) which enables either the purchaser or the retailer to input the purchase amount.

The proportion of the purchase that the retailer contributes to the jackpot may be a set amount (say 3%) or may be any amount that the retailer is prepared to contribute. For example, retailers within a shopping mall may contribute different percentages of purchase prices to the jackpot. Those retailers can then advertise this differing contribution. For example, a retailer that contributes 6% of the purchase price may advertise to the consumer that they offer double the chances of striking the jackpot than a retailer contributing only 3%.

When a contributed value from the device causes the jackpot total to reach the total chosen by the random number generator, then the jackpot is struck by the customer who made the purchase. It is envisaged that when this occurs that this will be broadcast to the retail establishment at large. For example, to the store where the purchase is made and possibly, to the shopping mall. The means by which this is indicated may be varied, possibly flashing lights, a large screen display or even an audible alarm.

Not only does this provide immediate gratification to the purchaser, but also acts to alert potential purchasers, perhaps inspiring them to a shopping frenzy.

The applicant has recognized that the best way to encourage and motivate people to participate in any activity is to provide the potential incentive for them to get something for nothing or to win a prize. Obviously, the bigger the prize, the better the incentive. However, there are two other critical components necessary before a promotion can be assured of a success.

The first of those is for the customer to witness that prizes (irrespective of value) are being won frequently.

The second is that there is an element of instant gratification.

Therefore, to motivate potential customers to firstly participate in promotion and then to retain their interest or stimulate more vigorous participation, the following key elements of the present invention have been incorporated. These are adequate incentive, high activity band and instant gratification.

1) Adequate Incentive

The customer must be attracted to the promotion sufficiently for them to go out of their way to participate and not go to what may be possibly a more conveniently located competitor.

2) High Activity Band

Any promotion that offers prizes must be seen to be delivering these prizes. The promotion prizes must be clearly visible to the customer and create an intense desire within the customer to obtain these prizes by participating. In the preferred embodiments of the present inventions the jackpot sum is displayed to all shoppers as discussed previously.

3) Instant Gratification

In today's fast moving world customers want services as quickly as they possibly can have it. Responding to these customer demands-companies now place high priorities in fast convenient service. In other words they are striving to ultimately achieve an objective of instant gratification for the customer. For a promotion to be successful this too is a critical component to strive for.

With the present invention, the retail data manipulation, is such that instant gratification has been achieved through real time processing.

Promotions in the past have required customers to wait hours, days, weeks, and in some cases months, before a promotion is complete and a draw is conducted. For example, raffles. Customers may initially be attracted to these promotions, but quickly lose interest in them in that motivation to continue to participate. Eventually the promotions attraction value diminishes to a point where it simply fees out. This promotion has failed to deliver the convenience and speed of service that customers now demand.

It should be apparent now that the present invention addresses and remedies inherent problems associated with operating promotions through a system of retail data manipulation. It can successfully deliver all three capital ingredients to ensure that promotions are not only attracted to customers initially, but retain or increases attraction throughout the entire life of the promotion.

The present invention also addresses problems facing retails by providing "good value for money".

It is difficult for retailers to determine whether traditional methods of retailing promotions are effective with regard to how much the campaign costs and how much business it would have got anyway without the campaign.

It can be seen with the present invention that retailers have control over the amount of money they spend by assigning a percentage of the purchase price to the jackpot total. Thus, the present invention provides a far more quantifiable approach for retailers.

The jackpot can be arrived at by a variety of means, but in preferred embodiments the initial amount is a fund contributed to by the retail outlets in the mall or shops in a retail chain.

This jackpot may be run simultaneously with other jackpots of the same nature which encourages continuous shopping. For example, there may be displayed a value range in which the jackpot may trigger. Shoppers would be advised of the strike parameters when any of the jackpots enter their parameters. With multiple jackpots there is more incentive to shop.

In one embodiment of the present inventions, jackpot strike parameters may be set to incorporate multi-level jackpot values simultaneously. One possible apportionment of values may be as provided in the table below.

| Jackpot Number | Strike Parameters |
| --- | --- |
| 1 | $50–$500 |
| 2 | $501–$2500 |
| 3 | $2501–$5000 |
| 4 | $50001–$10000 |
| 5 | $10001–$25000 |

It can be seen that this invention has sufficient novelty (the use of a game of chance) to attract consumers to particular retail area.

Further, it should be appreciated that the present invention encourages consumers to spend more. This is because the number of entries that the consumer has into the game of chance is proportional to the amount of money spent by the consumer.

It should be appreciated that this aspect of the present invention need not only be used in shopping malls but can be used in any particular retail outlet or any other outlet (even including the Internet) where purchases are made.

Thus, the system has the advantage of providing incentive for consumers to purchase items which now carries with it the possibility of winning a large sum of money, and to be told of the winnings rapidly at point of sale,

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
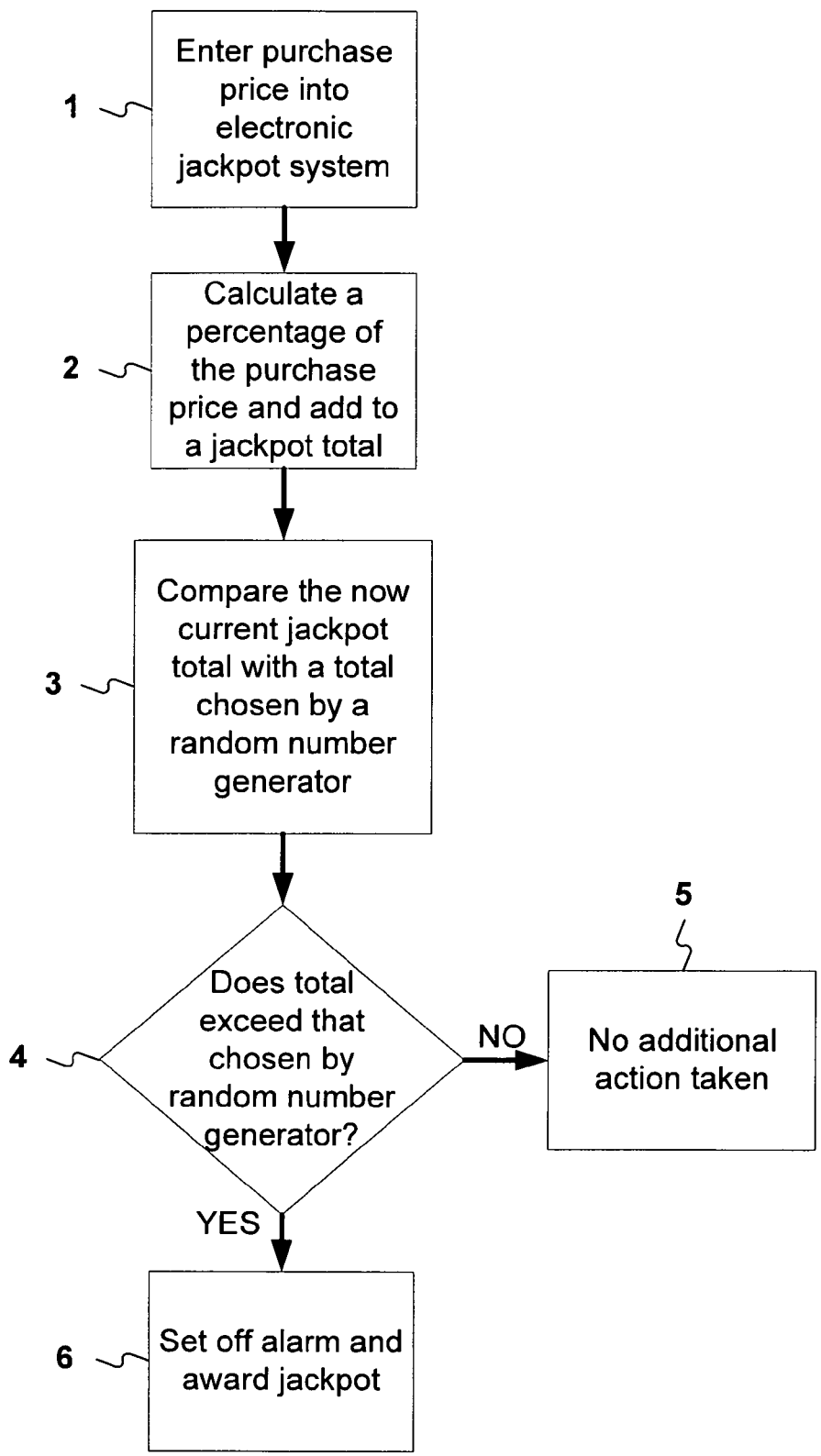
FIG. 1 shows a schematic of the process followed in the present invention.

Stage 1 is the purchaser or retailer entering the purchase price into the electronic jackpot system.

Stage 2 is the system calculating a percentage of the purchase price which is then added to a jackpot total.

Stage 3 is the stage of comparing the now current jackpot total with a total chosen by a random number generator.

At Stage 4, if the total exceeds that chosen by the generator, the alarm goes off and the jackpot awarded in Stage 6. If no match, then that purchase amount is just added to the jackpot total as in Stage 5.

Aspects of the present invention have been described by way of example only and it should be appreciated that modifications and additions may be made thereto without departing from the scope of the appended claims.

The invention claimed is:

1. A method of manipulating retail data characterised by the steps of:
   (a) operating a random number generator to set a jackpot threshold, and
   (b) receiving a purchase amount transmitted from at least one dedicated terminal associated with an electronic data manipulation system, and
   (c) adding a percentage of said purchase amount to a jackpot total associated with the electronic data manipulation system, and
   (d) determining a win or no win condition, where a win condition indicates that the jackpot total equals or exceeds the set jackpot threshold, and
   (e) immediately indicating via the electronic data manipulation system whether the purchase amount transmitted caused a win condition, and
   (f) repeating steps (b) through (e) for each new purchase if a no win condition is determined.

2. The method as claimed in claim 1, wherein the dedicated terminal includes a device adapted to receive and then transmit the purchase amount to the electronic data manipulation system.

3. The method as claimed in claim 1, wherein the percentage amount added to the jackpot total is varied.

4. The method as claimed in claim 1, wherein the selection of a win condition is broadcast to a retail establishment.

5. The method as claimed in claim 1, which uses real time processing.

6. The method as claimed in claim 1, which is further adapted to display via display means a value range for the jackpot threshold.

* * * * *